United States Patent [19]

Mandle

[11] Patent Number: 4,959,725
[45] Date of Patent: Sep. 25, 1990

[54] METHOD AND APPARATUS FOR PROCESSING CAMERA AN IMAGE PRODUCED BY A VIDEO CAMERA TO CORRECT FOR UNDESIRED MOTION OF THE VIDEO CAMERA

[75] Inventor: Gary Mandle, Redwood City, Calif.
[73] Assignee: Sony Corporation, Tokyo, Japan
[21] Appl. No.: 218,626
[22] Filed: Jul. 13, 1988
[51] Int. Cl.⁵ .............................. H04N 5/232
[52] U.S. Cl. .................... 358/222; 358/105
[58] Field of Search ........... 358/222, 217, 223, 229, 358/105, 125, 126

[56] References Cited

U.S. PATENT DOCUMENTS

4,717,958 1/1988 Gal et al. .......................... 358/222
4,774,589 9/1988 Rowland .......................... 358/222

Primary Examiner—James J. Groody
Assistant Examiner—Robert M. Bauer
Attorney, Agent, or Firm—Limbach, Limbach & Sutton

[57] ABSTRACT

A method and apparatus for processing a raw video camera signal to identify undesired multidimensional video image motion caused by rotational or translational camera motion in two or three dimensions, and to generate a corrected video camera signal in which such undesired video image motion is reduced. In a preferred embodiment, the apparatus includes a video camera having an oversized image pickup device, four accelerometers mounted in the video camera, and means for processing the accelerometer output signals and the raw video camera output signal to generate a corrected video camera signal. The processing means preferably employs selective clocking to generate a corrected video signal representing a stabilized version of the view of interest. Such a corrected video signal will exclude extraneous visual information (i.e., visual information other than the view of interest), and will be "stabilized" in the sense that it exhibits less image motion than does the draw video camera signal. The preferred embodiment of the invention is capable of efficiently correcting for undesired camera rotation about three orthogonal rotational axes, as well as for undesired camera translations in a plane orthogonal to the axis of symmetry of the camera lens.

28 Claims, 8 Drawing Sheets

METHOD AND APPARATUS FOR PROCESSING CAMERA AN IMAGE PRODUCED BY A VIDEO CAMERA TO CORRECT FOR UNDESIRED MOTION OF THE VIDEO CAMERA

FIELD OF THE INVENTION

The invention is a method and apparatus for processing a video camera signal to correct for undesired camera motion. More particularly, the invention is a method and apparatus for processing an uncorrected video camera signal to identify undesired video image motion caused by camera motion, and to generate a corrected video camera signal in which such undesired video image motion is reduced.

BACKGROUND OF THE INVENTION

Conventional video cameras generate a video signal by employing an image pickup device (typically a chargecoupled device, or "CCD") to store each of a plurality of images sequentially, and a means for converting the sequence of stored images into a video signal. When aiming the camera lens at an image of interest, undesired camera movement will result in undesired motion of the image relative to the image pickup device and hence, relative to each field of the video signal.

A means for correcting the video signal to compensate for undesired camera motion in a single direction has been described in Japanese Patent Application 57-83977 by Sony Corporation, published May 26, 1982. In Patent Application 57-83977, the image of interest occupies only a portion of the image pickup device, so that movement of the camera in one dimension will cause the image to translate in one direction relative to the edges (or "borders") of the pickup device. An acceleration detector is mounted in the video camera, and circuitry is provided for correcting for undesired movement of the image (in a single direction only) relative to the image pickup device, in order to produce a corrected video signal exhibiting reduced image motion in such single direction.

However, until the present invention it has not been known how efficiently to correct video signals for undesired camera rotational and translational motion in two or three dimensions.

SUMMARY OF THE INVENTION

The invention is a method and apparatus for processing an uncorrected video camera signal to identify undesired multidimensional video image motion caused by rotational or translational camera motion in two or three dimensions, and to generate a corrected video camera signal in which such undesired video image motion is reduced.

In a preferred embodiment, the apparatus of the invention includes a video camera having an oversized image pickup device, four motion sensors (which may be accelerometers) mounted in the video camera, and means for processing the accelerometer output signals and the raw video camera output signal to generate a corrected video camera signal. If the camera accidentally moves while the image pickup device is exposed to a view of interest, an image of the view (sometimes referred to herein as a "primary" image) will correspondingly move relative to the image pickup device. The processing means will employ selective clocking to generate a corrected video camera signal representing a stabilized version of the view of interest. Such a corrected video camera signal will exclude extraneous visual information (i.e., visual information, sometimes referred to herein as a "secondary") image, other than the primary image) and will be "stabilizedy" in the sense that it exhibits less primary image motion than does the raw video camera signal.

The preferred embodiment of the invention is capable of efficiently correcting for undesired camera rotation about three orthogonal rotational axes, as well as for undesired camera translations in a plane orthogonal to the axis of symmetry of the camera lens (which axis typically coincides with an axis of symmetry of the image pickup device).

BRIEF DESCRIPTION OF THE DRAWINGS

Each of FIGS. 1(a), 1(b), and 1(c) is a different, simplified, side view of the same video camera (on which video camera a set of accelerometers is mounted). FIG. 1(a) is in the x-z plane; FIG. 1(b) is in the x-y plane; and FIG. 1(c) is in the y-z plane.

Each of FIGS. 3(a), 3(b), 3(c), 3(d), and 3(e) is a simplified elevational view of the charge-coupled device of FIG. 2, with the video image region rotated or translated,/with respect to the position said region occupies in FIG. 2.

DETAILED DESCRIPTION OF THE PREFERRED EMBODIMENTS

Figure 1:
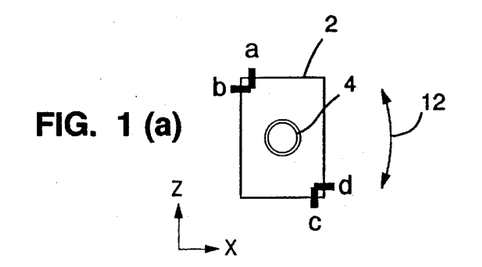

In a first preferred embodiment, the apparatus of the invention includes video camera 2, which in turn includes lens 4, a set of four accelerometers (a, b, c, and d), and an oversized image pickup device 6. FIGS. 1(a), 1(b), and 1(c) represent three orthogonal views of video camera 2.

Each accelerometer is represented as a line segment oriented to indicate the direction in which that accelerometer is sensitive. Thus, accelerometers "a" and "c" are sensitive to acceleration in the "z" direction, and accelerometers "b" and "d" are sensitive to acceleration in the "x" direction. Accelerometers "a" and "c" are separated from each other in all three of the "x", "y", and "z" directions, and accelerometers "b" and "d" are separated from each other in all three of the "x", "y", and "z" directions.

Preferably, all the accelerometers in camera 2 are identical. With such identical accelerometers positioned as shown in FIGS. 1(a)-1(c), the accelerometer output signals can be combined as shown in Table 1, to indicate the camera motions shown in Table 1.

TABLE 1

| Combined Outout Signal | Camera Motion |
| --- | --- |
| (bd), when (ac) = zero. | Rotation about the z axis. |
| (abcd) | Rotation about the y axis. |
| (ac), when (bd) = zero. | Rotation about the x axis. |
| (bd), when a = c. | Translation along the x axis. |
| (ac), when b = d. | Translation along the z axis. |

In Table 1, the symbols a, b, c, and d represent the output signals produced in accelerometers a, b, c, and d, respectively.

Figure 2:
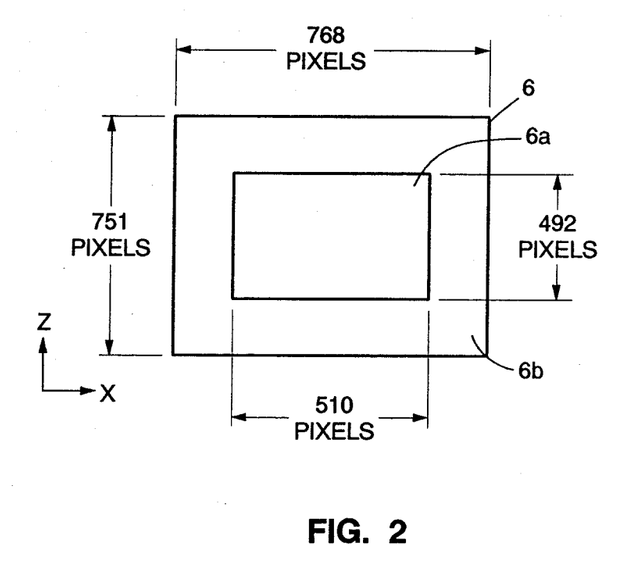
FIG. 2 is a simplified elevational view of an oversized charge-coupled device, with a video image region occupied by a video image.

In camera 2 of FIGS. 1(a) through 1(c), image pickup device 6 is preferably a charge-coupled device ("CCD") using a frame interline transfer construction, as shown in FIG. 2. CCD 6 and lens 4 are spaced from each other along the y axis, and CCD 6 has a flat surface oriented orthogonal to the y axis.

FIG. 2 shows a preferred embodiment of CCD 6, which includes a rectangular pixel array. CCD 6 is "oversized" in the sense that it includes a video image region 6(a) and a peripheral region 6(b). In a preferred embodiment, video image region 6(a) includes 510 horizontally spaced columns of pixels (each associated with a different coordinate along the x axis) and 492 vertically spaced rows of pixels (each associated with a different coordinate along the z axis), and CCD 6 (including both video image region 6(a) and peripheral region 6(b)) includes 768 horizontally spaced columns of pixels (each associated with a different coordinate along the x axis) and 751 vertically spaced rows of pixels (each associated with a different coordinate along the z axis). In this embodiment, the CCD may be exposed to a view whose image on the CCD has size 510 pixels×492 pixels, and such image may move relative to the CCD's 768×751 pixel array as the camera moves relative to the view being imaged on the CCD.

An oversized CCD having an 768×751 array of pixels (i.e., a total of 576,070 pixels, in contrast with a total of 250,920 pixels for a conventional 510×492 array) allows room for a half-frame correction (in all four of the directions +x, −x, +z, and −z) of each frame of the raw video signal generated from the CCD's output, provided that each frame of the corrected video signal generated in accordance with the invention consists of an array of 510×492 pixels.

Conventional CCD's are typically manufactured to have size 8.8 mm in the x-direction, and 6.6 mm in the z-direction. In manufacturing an oversized CCD, it may be desirable to expand these outer dimensions, for example to 13.2 mm and 9.9 mm, respectively, in order to avoid potential manufacturing difficulties in achieving high pixel densities, particularly in the z-direction.

FIGS. 3(a) through 3(e) represent the pixel array of CCD 6 of FIG. 2, with the image which occupied the entirety of region 6(a) in FIG. 2 (the "primary" image) shown rotated or translated with respect to the position of region 6(b) in FIG. 2. Thus, each of FIGS. 3(a) through 3(e) represents a CCD output signal which is not only indicative of the primary image, but is also indicative of a "secondary" image occupying the portion of the pixel array not occupied by the primary image.

Figures 3A, 3B:
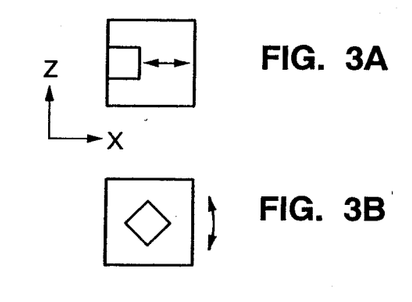
Figure 3C:
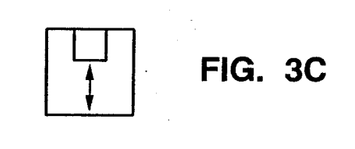
Figure 3D:
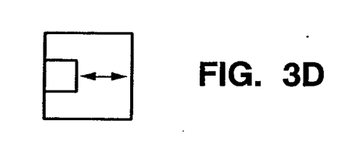
Figure 3E:
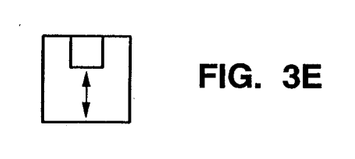

More specifically, FIG. 3(a) represents a CCD output signal in which the position of the primary image has been rotated (with respect to the CCD's pixel array) as a result of rotation of camera 2 about the z axis (i.e., along path 10 of FIG. 1(b)). Similarly, FIG. 3(b) represents a CCD output signal in which the position of the primary image has been rotated (with respect to the CCD's pixel array) as a result of rotation of camera 2 about the y axis (i.e., along path 12 of FIG. 1(a)), FIG. 3(c) represents a CCD output signal in which the position of the primary image has been rotated (with respect to the CCD's pixel array) as a result of rotation of camera 2 about the x axis (i.e., along path 14 of FIG. 1(c)), FIG. 3(d) represents a CCD output signal in which the position of the primary image has been translated (with respect to the CCD's pixel array) as a result of translation of camera 2 along the x axis (i.e., along path 16 of FIG. 1(b)), and FIG. 3(e) represents a CCD output signal in which the position of the primary image has been translated (with respect to the CCD's pixel array) as a result of translation of camera 2 along the z axis (i.e., along path 18 of FIG. 1(c)).

A preferred embodiment of the circuitry of the invention for processing signals produced in camera 2 of FIGS. 1(a) through 1(c) will be described with reference to FIG. 4. Accelerometers a, b, c, and d of FIGS. 1(a) through 1(c) correspond to accelerometers 20, 21, 22, and 23, respectively. It should be appreciated that more than four accelerometers mounted in the video camera may supply signals to the circuitry of the invention, in alternative embodiments of the invention. Accelerometers 20-23 will preferably be selected from those small, lightweight units commercially available, which output an acceleration signal only in the event of a change in camera velocity (not when the camera is moving with constant velocity in a single direction). It is contemplated however, that motion sensors other than accelerometers may be substituted in alternative embodiments of the invention. For example, velocity or displacement sensors may be employed in place of accelerometers 20-23, provided that corresponding changes in the associated processing circuitry is made (in a manner that will be apparent to those of ordinary skill in the art), to produce acceleration signals from the sensors.

The acceleration signals from sensors 20 through 23 are processed in movement filters 24 through 27, respectively, and are supplied to summation logic unit 28. Each of movement filters 22-27 is a clipping device designed to discriminate between accelerations having magnitude above and below a selected value, so that the circuit of the invention will not correct for small camera velocity variations, such as those which occur when the camera operator intentionally performs a camera pan. If the camera operator shifts the camera in a slow steady movement, the FIG. 4 circuit will not perform video signal corrections at the beginning and end of such movement.

Summation logic unit 28 calculates camera movement changes, and generates start (and stop) flag signals for expansion unit 34 and shift generator unit 36, and shift flag signals for shift generator unit 36. After generating a start flag, logic unit 28 counts five hundred and ten samples by counting successive pulses of a synchronization signal derived from timing signal generation unit 38. At the end of such counting operation, logic unit 28 sends a stop flag to expansion unit 34 and shift generator circuit 36.

Timing signal generation unit 38 sends synchronization signals to the camera's image pickup device (which preferably includes a CCD, such as CCD 6 shown in FIG. 4) for use in transferring signals stored in such pickup device to the camera's video signal generating circuit 39.

Circuit 39 is selected from conventional circuits capable of producing a video camera signal from a set of image signals sequentially transferred thereto from an image pickup device. The raw (uncorrected) video camera signals generated in circuit 39 are supplied to expansion circuit 34.

Circuit 36 receives a horizontal clock signal from timing generator 38, and a horizontal sample clock signal from logic unit 28, and outputs a "Write" clock signal and a "Read" clock signal to expansion circuit 34.

The function of expansion circuit 34 is to reclock the uncorrected video camera signal out of circuit 39 at a standard line rate (such as the standard NTSC or PAL line rate), to produce a corrected video signal. More specifically, in response each flag received from logic device 28, expansion circuit 34 will commence a clock shift operation to recover 510 pixels, comprising a horizontal line of the video image of interest, at standard line rate (such as the NTSC or PAL rate). The corrected video signal comprising the horizontal lines emerging from expansion circuit 34 may be used as desired. For example, it may be supplied back to the video camera and recorded in the camera on magnetic tape.

In the case that lens 4 of camera 2 is a telephoto lens, correction ratio unit 30 supplies correction values to unit 28 to compensate for different lens positions of lens 4. Unit 30 (to be discussed in detail below with reference to FIG. 5) compares a first reference voltage with a second voltage signal indicative of lens position, and sends horizontal and vertical correction signals to logic unit 28. If the lens 4 is in its "wide angle" position, correction of the raw video signal from the camera will be very limited. However, if lens 4 is in its "telephoto" position, the circuit of the invention will provide greater correction for the same filtered acceleration signal received from one of filters 24–27.

Figure 4:
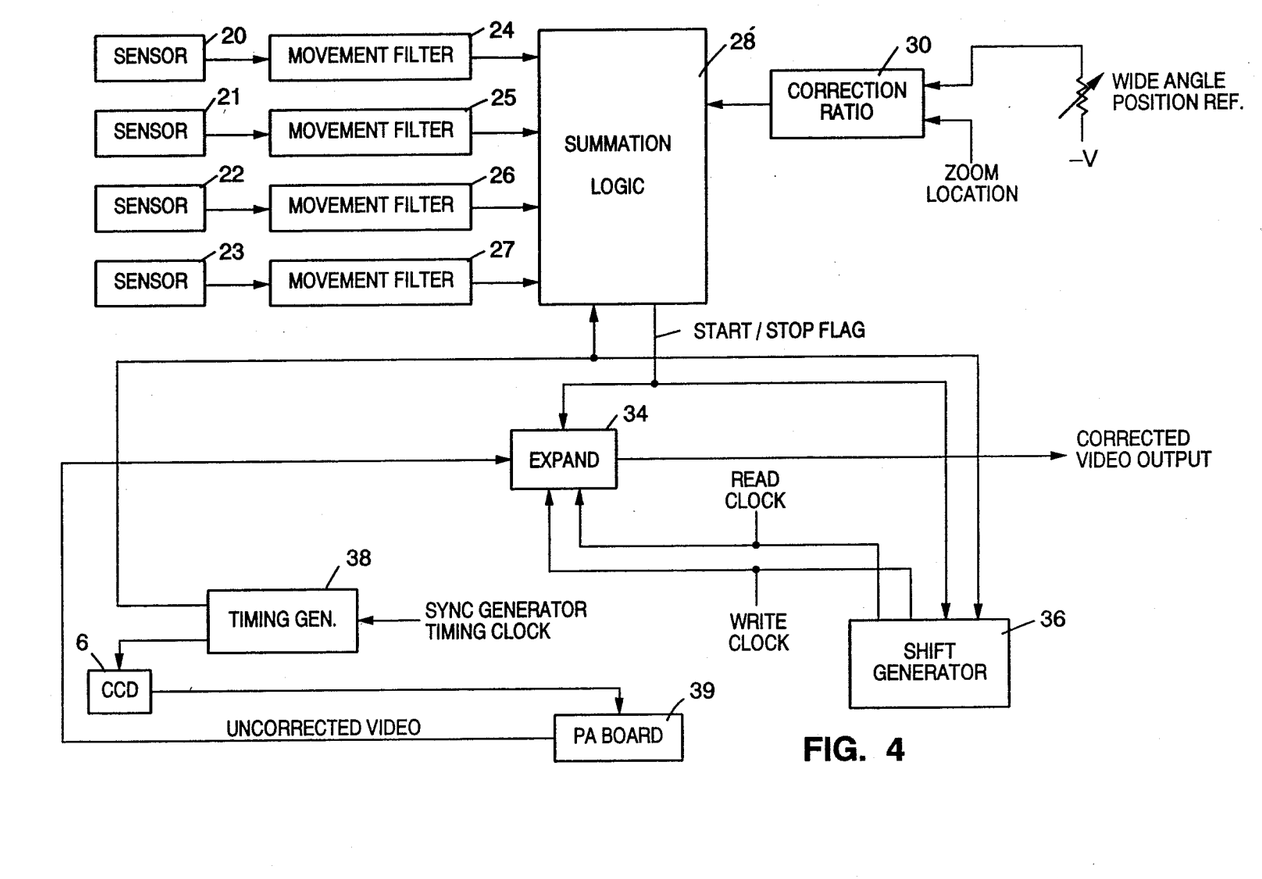
FIG. 4 is a block diagram of a preferred embodiment of the apparatus of the invention.

FIGS. 5–8 are a schematic diagram of a preferred embodiment of the FIG. 4 system.

Figure 5:
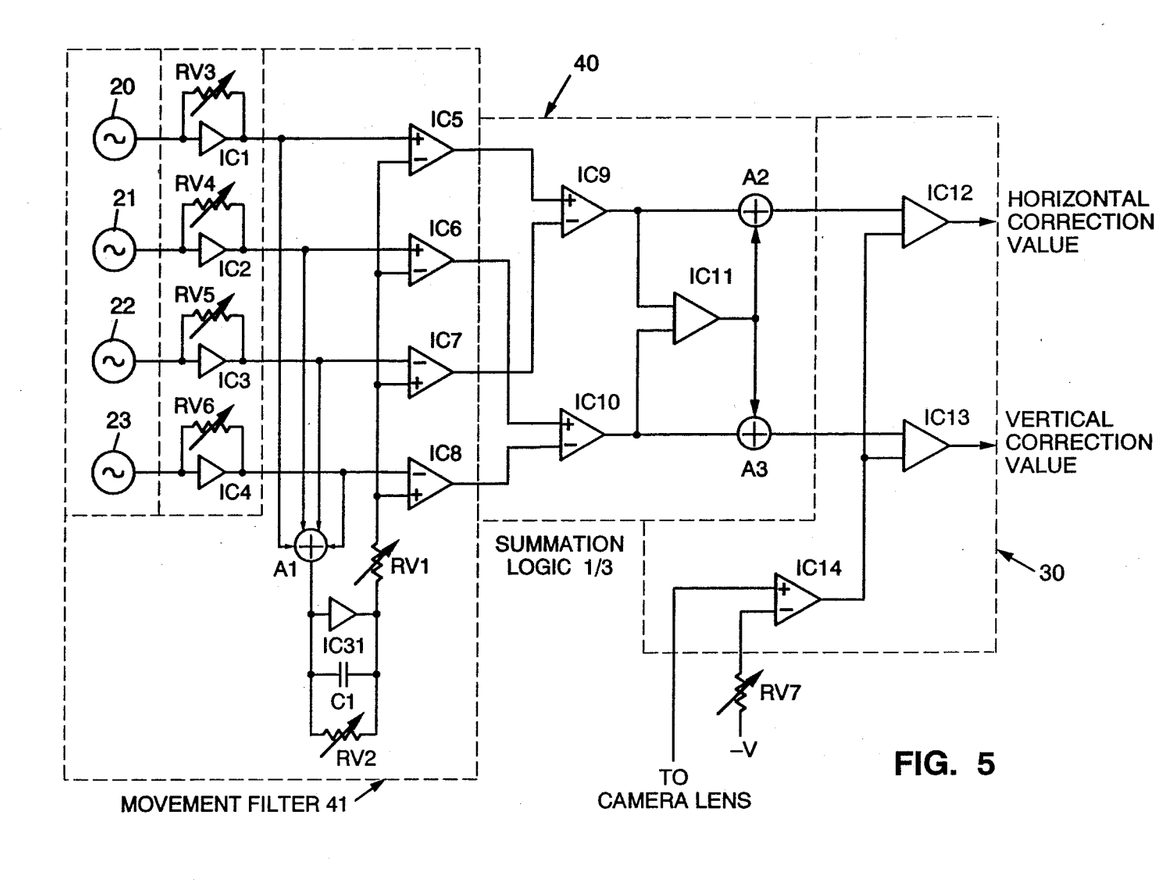
FIG. 5 is a schematic diagram of a first portion of the FIG. 4 circuit.

Sensors 20, 21, 22, and 23 of FIG. 5 send acceleration signals to op amp circuits IC1, IC2, IC3, and IC4, respectively. Variable resistors RV3, RV4, RV5, and RV6, connected across the input and output terminals of circuits IC1, IC2, IC3, and IC4, respectively, set up an output gain for amplifying the acceleration signals to useful levels.

Movement filter unit 41 includes the assembly comprising op amp IC31, variable resistors RV1 and RV2, and capacitor C1, which receives the output of summation unit A1 (representing the summed output of circuits IC1, IC2, IC3, and IC4). The resistances of variable resistors RV1 and RV2 may be set for the above-described purpose of discriminating between acceleration signals having amplitude above a selected voltage, and acceleration signals having amplitude below such selected voltage. The output of the assembly comprising circuits IC31, RV1, RV2, and C1 is supplied to the positive input of each of comparators IC7 and IC8, and to the negative input of each of comparators IC5 and IC6. The amplified acceleration signals from circuits IC1, IC2, IC3, and IC4 are supplied to the positive input of comparator IC5, the positive input of comparator IC6, the negative input of comparator IC7, and the negative input of comparator IC8, respectively.

Figure 9:
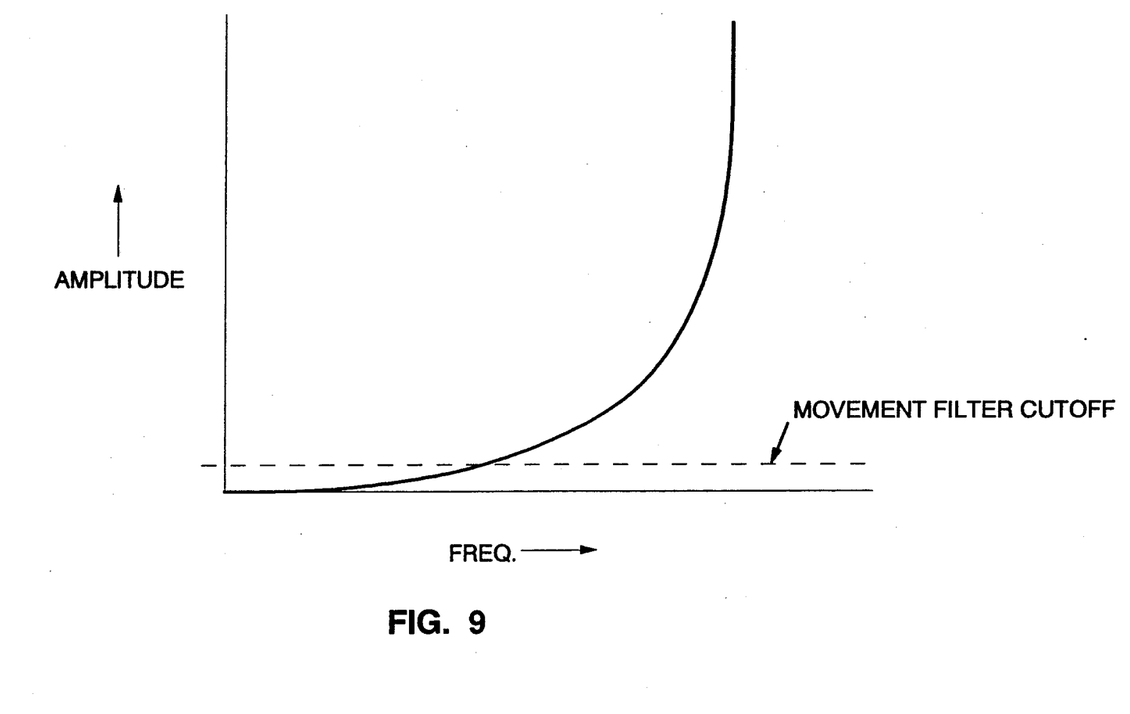
FIG. 9 is a graph of the amplitude versus frequency characteristics of a preferred embodiment of the movement filter of FIG. 4.

The output of each of comparators IC5, IC6, IC7, and IC8 is an analog signal indicative only of undesired camera movements (having high frequency, large amplitude, or both). Movement filter circuit 41 is designed to have the amplitude versus frequency characteristics shown in FIG. 9. As FIG. 9 indicates, the output of movement filter 41 will not be indicative of acceleration signal frequency components having sufficiently frequency below a characteristic cutoff frequency, and the output of movement filter 41 will not be indicative of acceleration signal frequency components having frequency above the characteristic cutoff frequency unless such high frequency components have amplitude in excess of a characteristic cutoff amplitude.

The output signals of comparators IC5 and IC7 are supplied respectively to the positive and negative inputs of comparator IC9, and the output signals of comparators IC6 and IC8 are supplied respectively to the positive and negative inputs of comparator IC10. The output signals of comparators IC9 and IC10 are supplied respectively to the positive and negative inputs of comparator IC11 (circuit IC11 thus generates a signal for compensating for camera rotations about the y axis). The outputs of comparators IC9 and IC11 are summed in summation unit A2, and the outputs of comparators IC11 and IC10 are summed in summation unit A3.

The output of unit A2 is a horizontal correction signal, and the output of unit A3 is a vertical correction signal. The correction ratio circuitry within block 30 of FIG. 5 qualifies these correction signals with lens position signals, as discussed above with reference to FIG. 4.

Comparator IC14 of correction ratio circuitry 30 compares a first reference voltage (supplied from voltage source $-V$ through variable resistor RV7) with a second voltage signal (supplied from lens 4 of camera 2) indicative of the position of lens 4. The output of IC14 is supplied to a first input of each of comparators IC12 and IC13. The other input of IC12 receives the output of unit A2, and the other input of IC13 receives the output of unit A3. The output of comparator IC12 is a modified horizontal correction signal, which is supplied to low pass filter L1 shown in FIG. 6. The output of comparator IC13 is a modified vertical correction signal, which is supplied to low pass filter L2 shown in FIG. 6.

Figure 6:
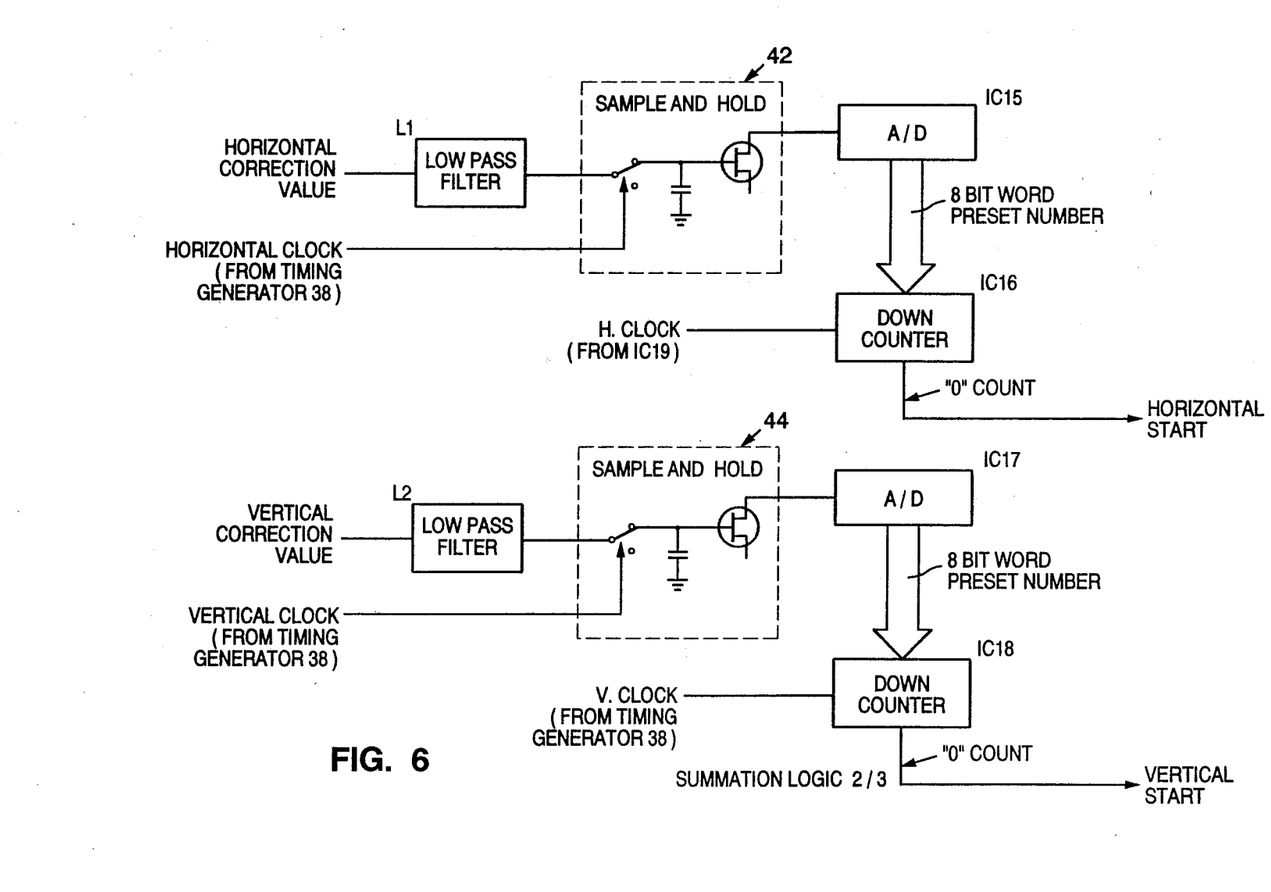
FIG. 6 is schematic diagram of a second portion of the FIG. 4 circuit.

The filtered horizontal correction signal emerging from filter L1 is supplied to sample and hold circuit 42. The filtered vertical correction signal emerging from filter L2 is supplied to sample and hold circuit 44. Sample and hold circuits 42 and 44 respectively receive horizontal and vertical clock signals from timing generator 38. The horizontal and vertical clock signals supplied to circuits 42 and 44 have the same frequency and phase as the horizontal and vertical clock signals that are supplied to the camera's image pickup device (CCD 6) from generator 38 for use in reading data out of such image pickup device.

Each sampled and held signal clocked out of circuit 42 is converted to an eight-bit digital signal in analog to digital converter IC15. Each sampled and held signal clocked out of circuit 44 is converted to an eight-bit digital signal in analog to digital converter IC17. The signals output from A-to-D converters IC15 and IC17 are respectively supplied to down counters IC16 and IC18.

Figure 7:
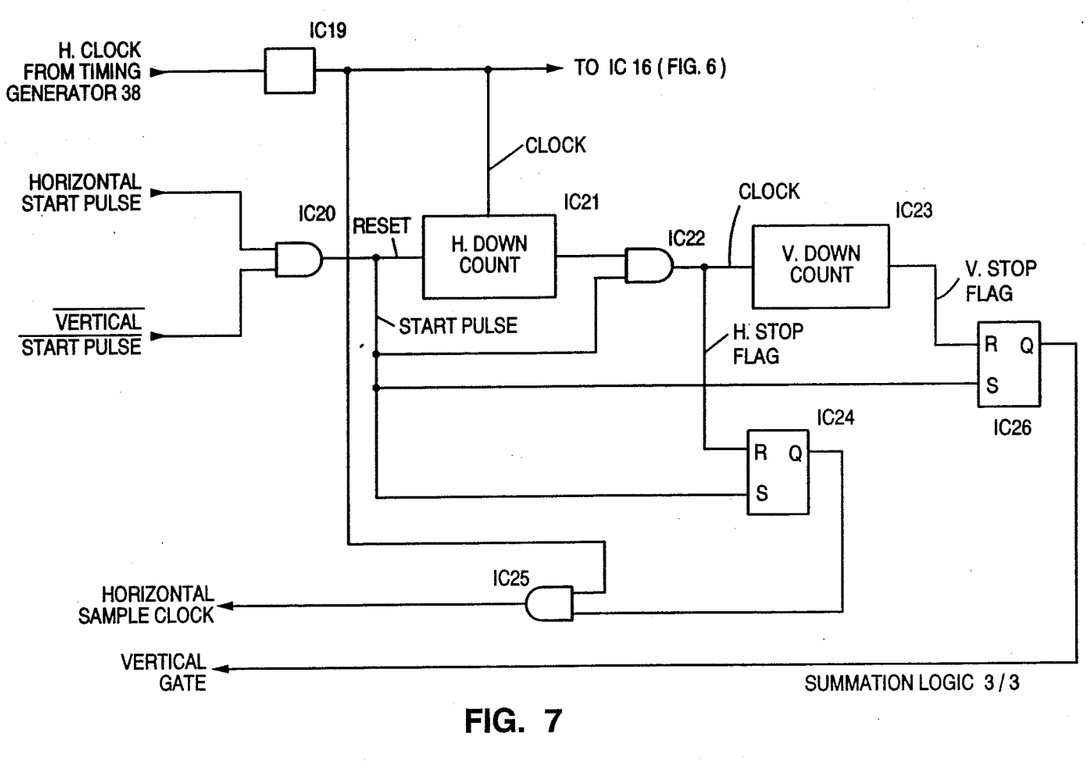
FIG. 7 is a schematic diagram of a third portion of the FIG. 4 circuit.

Counter IC16 is clocked by the buffered horizontal clock signal emerging as the outut of buffer IC19 (as shown in FIG. 7). The horizontal clock signal produced by timing generator 38 and supplied to circuit IC19, and hence the buffered clock signal supplied to IC16, will preferably have frequency equal to 14.32 MHz (in an NTSC format video camera) and 14.75 MHz (in a PAL format video camera).

Counter IC18 is clocked by a 23.936 KHz vertical clock signal supplied from timing generator 38. Such vertical clock signal is preferably the same signal that is employed for controlling the loading of video information from the shift registers of CCD 6 and sending such video information to the frame transfer area in CCD 6. The clock signal supplied to IC18 is thus timed so as to make a movement sample precisely at the moment that video is saved in the frame transfer area of CCD 6.

When counter IC16 counts down to zero, it outputs a horizontal start pulse. When counter IC18 counts down to zero, it outputs a vertical start pulse. The horizontal start pulse, and the inverse of the vertical start pulse, are supplied to different inputs of AND gate IC20. The output of circuit IC20 is supplied to horizontal down counter IC21, AND gate IC22, and to the "set" terminals of flip-flops IC24 and IC26.

Counter IC21 is always preloaded with the horizontal pixel count of the corrected video image (which is equal to 510 in a preferred embodiment of the invention). Counter IC21, which is clocked by the output of OR gate IC19, will commence to count downward upon being reset by a start pulse from IC20. When counter IC21 has counted down to the "zero" count, it outputs a flag signal to one input terminal of AND gate IC22. The other input terminal of IC22 is connected to the output of IC20. The output of IC22 is employed as the clock signal for counter IC23.

The output of IC20 is also supplied to the "set" terminal of flip-flop IC24. The output of flip-flop IC24 is combined with the output of IC19 in AND gate IC25. The output of IC25 is employed as a horizontal sample clock, and is supplied to switch S2 and timing generator circuit IC29 (shown in FIG. 8).

Counter IC23 is clocked by the output pulses supplied from IC22, each of which pulses represents the end of a horizontal line. When counter IC23 has counted down to "zero" it outputs an "end of field" flag signal (denoted "V stop flag" in FIG. 7). The end of field flag is supplied to the "reset" terminal of flip-flop IC26. In response to a pulse supplied from IC23 or IC20, IC26 supplies a "Vertical Gate" signal to switch S1 (shown in FIG. 8). One such "Vertical Gate" signal opens switch S1 to terminate a read/write operation (to be described below) involving CCD units IC27 and IC28, said read/write operation having been started in response to prior pulses on the "Horizontal Sample Clock" line emerging from IC25, and the "Vertical Gate" line emerging from IC26.

Figure 8:
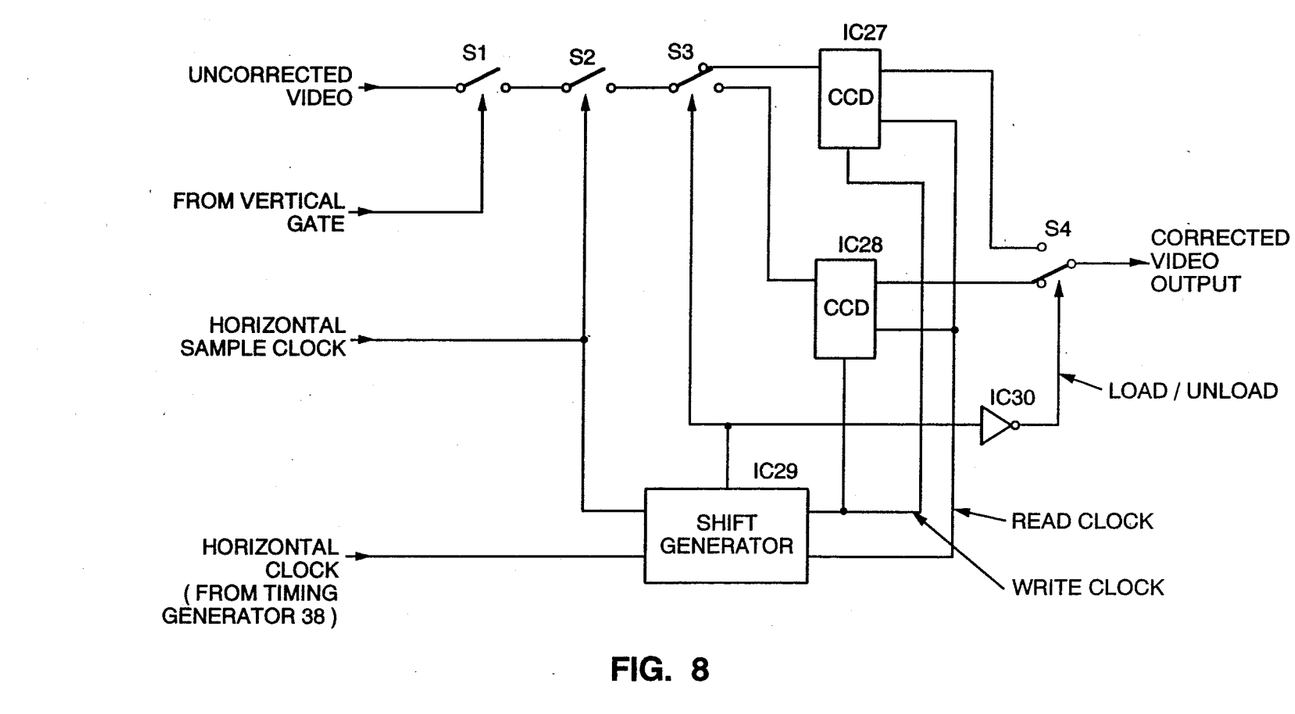
FIG. 8 is a schematic diagram of a fourth portion of the FIG. 4 circuit.

With reference to FIG. 8, the uncorrected video signal from camera 2 is supplied to switch S1. Switch S1 closes in response to a vertical gate flag pulse on the "Vertical Gate" line from IC26. Switch S2 is actuated in response to pulses on the "Horizontal Sample Clock" line from IC25 indicating that the image of interest (corresponding to the primary image portion of the camera's image pickup device output) is present on the uncorrected video signal line emerging from circuit 39 of camera 2. The "Horizontal Sample Clock" signal from IC25 is also supplied to shift generator unit IC29, to set the "Write" clock signal used by CCD units IC27 and IC28. The Horizontal Sample Clock Signal initially toggles switches S3 and S4. IC29 also follows the Horizontal Sample Clock, and after counting to 510, toggles S3 and S4 again.

Shift generator unit IC29 corresponds to shift generator block 36 in FIG. 4. The "expand" block 34 in FIG. 4 corresponds to CCD units IC27 and IC28 together with switches S2 and S3.

When switches S1 and S2 are closed, and switch S3 is connected to CCD unit IC27, the uncorrected video signal passes from switch S2 through switch S3, and is clocked into CCD unit IC27 by the "Write" clock signal from IC29.

After a first complete horizontal line is written into CCD unit IC27, switches S3 and S4 are switched by a "load/unload" signal generated in IC29 in order to connect the output of S2 with CCD unit IC28 so that a second horizontal line may be clocked into IC28 while shift generator IC29 supplies the "Write" clock signal to CCD unit IC28. During the same time period in which such second horizontal line is being written into IC28, shift generator IC29 supplies a "Read" clock signal to CCD unit IC27 in order to clock the first horizontal line out of IC27 at a desired rate (such as the NTSC rate) and supply such first line to the "Corrected video output" line. The preferred frequencies of the "Write" and "Read" clock signals output by IC29 are, respectively, 14.32 MHz and 9.545 MHz.

The "load/unload" signal from IC29 is inverted in IC30 before being supplied to switch S4, so that IC28 is connected to the "Corrected video output" line when IC27 is receiving data from the "Uncorrected Video" line, and IC27 is connected to the "Corrected video output" line when IC28 is receiving data from the "Uncorrected Video" line.

When this second horizontal line has been written into CCD unit IC28, switches S3 and S4 are switched again, so that a third horizontal line may be written into CCD unit IC27 and the second horizontal line may be read out of IC28.

In a class of preferred embodiments exemplified by FIGS. 1(a) through 8, the video camera image pickup device of the invention comprises an array of image sensing elements, where the array has dimensions larger than the image. For example, CCD 6 shown in FIG. 2 comprises an array of image sensing elements, referred to herein as "pixels". It should be understood, however, that it is within the scope of the invention to substitute other image pickup devices including image sensor arrays for CCD 6 of FIG. 2.

The array of image sensing elements is positioned conventionally relative to the camera's lens (as shown in FIGS. 1(b) and 1(c)) so as to be exposed to an image (the "primary" image) emerging from such lens. Because the array is larger than the primary image, camera motion (whether desired or undesired) will cause the projection of the primary image on the array to move relative to the array (as shown in FIGS. 3(a) through 3(e)).

A set of camera motion sensors (such as motion sensors a, b, c, and d of FIGS. 1(a) through 1(c)) is attached to the camera, for generating camera motion signals indicative of the camera's motion in at least two dimensions. A means (such as the circuitry described with reference to FIGS. 5 through 8) is provided for generating control signals from the camera motion signals, for extracting a stabilized array signal from the array, where such stabilized array signal is indicative of the image and exhibits reduced undesired image motion (of the type due to undesired camera motion).

One variation of this class of embodiments, in which the stabilized array signal is extracted from a raw array signal, has been described with reference to FIG. 4. In FIG. 4, CCD unit 6 includes a means for scanning the pixel array of the CCD in response to timing signals from unit 38, to generate a sequence of image signals comprising a frame of video information. This sequence of image signal, which is supplied to unit 39, represents not only the output of the pixels of the CCD's peripheral region (i.e., the pixels which are not exposed to the primary image), but also the output of the pixels which are exposed to the primary image. Unit 39 accepts a sequence of such image signals and converts such sequence into the video signal identified above as the "uncorrected video camera" signal.

As described with reference to FIG. 8, circuitry responsive to the control signals on the "Vertical Gate", Horizontal Sample Clock", and "Horizontal Clock" signal lines (shown in FIG. 8) is provided for discarding all of the uncorrected video camera signal except the portions indicative of the output of those CCD pixels which have been exposed to the camera lens image. By this selective discarding operation, a stabilized array signal is generated from the uncorrected video camera signal.

The method of the invention includes the contemporaneous steps of: exposing an array of image sensing elements to a video camera image (where the array has dimensions larger than the image and where the array is oriented for exposure to the image so that undesired motion of the camera will cause undesired image motion relative to the array); and generating camera motion signals indicative of the camera's motion in at least two dimensions. Control signals for reducing undesired image motion due to undesired camera motion are then generated from the camera motion signals, and a stabilized array signal is extracted from the array in response to the control signals (where said stabilized array signal is indicative of the image and exhibits reduced undesired image motion due to undesired camera motion). In one variation of this preferred embodiment, the array comprises an image region to which the image is exposed, and a peripheral region, and the method includes the steps of: scanning substantially the entire array to generate a raw array signal comprising a first component representing the scanned peripheral region, and a second component representing the scanned image region; and then generating the stabilized array signal by extracting the second component from the raw array signal in response to the control signals.

In a second preferred embodiment, the method of the invention includes the steps of exposing an oversized image pickup device of a video camera to generate a set of output signals in a manner so that each output signal includes a primary image and a secondary image, and generating a raw video camera signal from the output signals in a manner so that the raw video camera signal exhibits primary image motion corresponding to undesired motion of the camera during the exposure step. While the image pickup device is being exposed, the motion of the camera, in at least two dimensions, is measured and camera motion signals indicative of such multidimensional camera motion are generated. The raw video signal and the camera motion signals are then processed to generate a corrected video signal which exhibits less primary image motion corresponding to undesired camera motion than does the raw camera video signal, and which preferably includes substantially no visual information other than the primary image.

Although either preferred embodiment of the method of the invention is preferably performed by operating the system described above with reference to FIGS. 4 through 8, it is contemplated that either embodiment may be implemented using alternative hardware. In a variation on the second preferred embodiment of the method of the invention, selective clocking is employed to separate the primary image from the raw video camera signal (so that the remainder of the raw video camera signal, representing the secondary image, may be discarded) and then to generate the corrected video signal from the primary image component of the raw video camera signal. Preferably the corrected video signal will have a desired standard format such as the conventional NTSC or PAL format.

The method of the invention, in either preferred embodiment, includes the step of measuring camera acceleration due to both rotational and translational motion in three dimensions. Alternatively, such acceleration may be measured due to camera motion in only two dimensions, or due to either rotational or translational camera motion but not both rotational and translational camera motion.

The foregoing is merely illustrative and explanatory of the invention. Various changes in the component sizes and shapes, and other details of the embodiments described herein may be within the scope of the appended claims.

What is claimed is:

1. A system for processing an image generated by a video camera, including:
   (a) an array of image sensing elements having dimensions larger than the image, wherein the array is oriented for exposure to the image so that undesired motion of the camera will cause undesired image motion relative to the array;
   (b) a set of camera motion sensors attached to the camera, for generating camera motion signals indicative of the camera's motion in at least two dimensions; and
   (c) a means for processing the camera motion signals to generate control signals for extracting from the array a stabilized array signal indicative of the image, wherein the stabilized array signal exhibits reduced undesired image motion due to undesired camera motion.

2. The system of claim 1, wherein the array comprises an image region to which the image is exposed, and a peripheral region, and wherein element (c) includes:
   (d) means responsive to the control signals for scanning the image region of the array to generate said stabilized array signal.

3. The system of claim 1, wherein the array comprises an image region to which the image is exposed, and a peripheral region, and wherein element (c) includes:
   (e) a means for scanning the array to generate a raw array signal, said raw array signal comprising a first component representing the scanned peripheral region, and a second component representing the scanned image region; and
   (f) means responsive to the control signals for generating said stabilized array signal by extracting the second component from the raw array signal.

4. The system of claim 1, also including means for generating a video signal from the stabilized array signal.

5. A method for processing an image generated by a video camera, including the steps of:
 (a) exposing an array of image sensing elements to the image, said array having dimensions larger than the image so that undesired motion of the camera during exposure will cause undesired image motion relative to the array;
 (b) contemporaneously with step (a), generating camera motion signals indicative of the camera's motion in at least two dimensions;
 (c) generating from the camera motion signals a set of control signals for reducing undesired image motion due to undesired camera motion; and
 (d) extracting a stabilized array signal from the array in response to the control signals, wherein said stabilized array signal is indicative of the image and exhibits reduced undesired image motion due to undesired camera motion.

6. The method of claim 5, wherein the array comprises an image region to which the image is exposed, and a peripheral region, and including the step of:
 (e) scanning the image region of the array, in response to the control signals, to generate said stabilized array signal.

7. The method of claim 5, wherein the array comprises an image region to which the image is exposed, and a peripheral region, and including the steps of:
 (f) scanning substantially the entire array to generate a raw array signal, said raw array signal comprising a first component representing the scanned peripheral region, and a second component representing the scanned image region; and
 (g) generating said stabilized array signal by extracting the second component from the raw array signal in response to the control signals.

8. The method of claim 5 also including the step of:
 (h) generating a video signal from the stabilized array signal.

9. A video signal processing system, including:
 (a) a video camera, including an oversized image pickup device for sequentially producing a set of output signals each indicative of a primary image and a secondary image, and also including a means for generating a raw video camera signal from the output signals, wherein the raw video camera signal exhibits primary image motion corresponding to undesired motion of the camera relative to a view being imaged by the camera;
 (b) a camera motion sensor array attached to the camera, for generating camera motion signals indicative of the camera's motion in at least two dimensions; and
 (c) means for processing the camera motion signals and the raw video camera signal to generate a corrected video signal which exhibits less primary image motion than does the raw vide camera signal.

10. The system of claim 9, wherein the image pickup device includes a video image region and a peripheral region.

11. The system of claim 9, wherein the image pickup device includes rectangular pixel array, and wherein said rectangular pixel array includes a video image region and a peripheral region.

12. The system of claim 11, wherein the rectangular pixel array is a 768 x 751 pixel array, and the video image region is a 510 x 492 pixel array.

13. The system of claim 9, wherein the camera motion sensor array includes an array of accelerometers.

14. The system of claim 9, wherein the accelerometers measure rotational motion of the camera in three dimensions.

15. The system of claim 9, wherein the accelerometers measure translational motion of the camera in two dimensions.

16. The system of claim 9, wherein the accelerometers measure rotational of the camera in two dimensions.

17. The system of claim 9, wherein the accelerometers measure translational motion of the camera in two dimensions.

18. The system of claim 9, wherein the camera motion sensor array includes an array of accelerometers, and also including:
 (d) a movement filter for filtering the output of each accelerometer and for supplying the filtered accelerometer output signals to element (c), wherein each filtered accelerometer output signal will indicate camera motion to element (c) only if the output of the associated accelerometer has magnitude above a selected value.

19. The system of claim 9, wherein element (c) includes a memory unit, a means for writing only the primary image component of the raw video camera signal into the memory unit, and a means for reading the primary image component out of the memory unit to produce the corrected video signal.

20. The system of claim 19, wherein the memory unit includes a first charge-coupled device and a second charge-coupled device, and wherein element (c) includes:
 a means for sequentially writing adjacent horizontal lines comprising the raw video camera signal's primary image component into altering ones of the first and second charge-coupled devices; and
 a means for reading one of said horizontal lines out of the second charge-coupled device while writing the next sequential one of said horizontal lines into the first charge-coupled device.

21. A video signal processing method, including the steps of:
 (a) A video signal processing method, including the steps of:
 (a) exposing an oversized image pickup device of a video camera to generate a set of output signals, in a manner so that each output signal includes a primary image and a secondary image;
 (b) generating a raw video camera signal from the output signals in a manner so that the raw video camera signal exhibits primary image motion corresponding to undesired motion of the camera during step (a);
 (c) during step (a), generating camera motion signals indicative of motion of the camera in at least two dimensions;
 (d) processing the camera motion signals and the raw video camera signal to generate a corrected video signal, where the corrected video signal exhibits less primary image motion than does the raw video camera signal.

22. The method of claim 21, wherein step (d) includes the steps of selectively clocking the raw video camera signal to separate the primary image components of the raw video camera signal from the secondary image components of the raw video camera signal, and generating the corrected video signal from the primary image components.

23. The method of claim 21, wherein the corrected video signal has NTSC format.

24. The method of claim 21, wherein the corrected video signal has PAL format.

25. The method of claim 21, wherein step (b) includes the step of measuring camera acceleration due to rotational motion of the camera in three dimensions.

26. The method of claim 25, wherein step (b) also includes the step of measuring camera acceleration due to translational motion of the camera in two dimensions.

27. The method of claim 21, wherein step (b) includes the step of measuring camera acceleration due to rotational motion of the camera in two dimensions.

28. The method of claim 21, wherein step (b) includes the step of measuring camera acceleration due to translational motion of the camera in two dimensions.

* * * * *